(12) United States Patent
Wang et al.

(10) Patent No.: US 11,535,284 B2
(45) Date of Patent: Dec. 27, 2022

(54) ANTI-IMPACT DEVICE AND WORKING METHOD THEREOF

(71) Applicant: SHANDONG UNIVERSITY OF SCIENCE AND TECHNOLOGY, Qingdao (CN)

(72) Inventors: Chenglong Wang, Qingdao (CN); Yifang Chen, Qingdao (CN); Xueqian Wei, Qingdao (CN); Xueting Wang, Qingdao (CN); Meng Chen, Qingdao (CN); Qingliang Zeng, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/619,263

(22) PCT Filed: May 7, 2020

(86) PCT No.: PCT/CN2020/088982
§ 371 (c)(1),
(2) Date: Dec. 15, 2021

(87) PCT Pub. No.: WO2021/155645
PCT Pub. Date: Aug. 12, 2021

(65) Prior Publication Data
US 2022/0204060 A1   Jun. 30, 2022

(30) Foreign Application Priority Data
Feb. 5, 2020 (CN) .......................... 202010080319.5

(51) Int. Cl.
*B61G 11/12* (2006.01)
*B61G 11/16* (2006.01)
(Continued)

(52) U.S. Cl.
CPC .............. *B61G 11/12* (2013.01); *B61G 11/16* (2013.01); *B61G 11/18* (2013.01); *F16F 9/535* (2013.01);
(Continued)

(58) Field of Classification Search
CPC ......... B61G 11/12; B61G 11/16; B61G 11/18; F16F 9/535; F16F 9/54; F16F 2224/045; F16F 2230/0005
See application file for complete search history.

(56) References Cited

FOREIGN PATENT DOCUMENTS

| CN | 101857040 A | * 10/2010 |
|---|---|---|
| CN | 101857040 A | 10/2010 |

(Continued)

*Primary Examiner* — Robert J McCarry, Jr.
(74) *Attorney, Agent, or Firm* — PROI Intellectual Property US; Klaus Michael Schmid (57) ABSTRACT

An anti-impact device includes a first connector, an upper outer cylinder, a lower outer cylinder and a second connector which are sequentially connected, where a top of the lower outer cylinder is sleeved with the upper outer cylinder to be movably connected to the upper outer cylinder; an aluminum honeycomb and a magnetorheological buffer outer cylinder are arranged inside the lower outer cylinder, the aluminum honeycomb is arranged at a bottom of a lower end cover, a piston rod is arranged inside the magnetorheological buffer outer cylinder, a top end of the piston rod extends out of an upper end cover and is connected to a collision head, and the piston rod between the collision head and the upper end cover is sleeved with a return spring; and an electromagnetic coil is wound around the piston rod, a damping piston is arranged at a lower part of the piston rod.

9 Claims, 5 Drawing Sheets

(51) Int. Cl.
   *B61G 11/18* (2006.01)
   *F16F 9/53* (2006.01)
   *F16F 9/54* (2006.01)
(52) U.S. Cl.
   CPC .......... *F16F 9/54* (2013.01); *F16F 2224/045* (2013.01); *F16F 2230/0005* (2013.01)

(56) References Cited

FOREIGN PATENT DOCUMENTS

| | | | |
|---|---|---|---|
| CN | 203948550 U | | 11/2014 |
| CN | 104477731 A | | 4/2015 |
| CN | 104528493 A | | 4/2015 |
| CN | 204280959 U | | 4/2015 |
| CN | 105351431 A | | 2/2016 |
| CN | 107781278 A | | 3/2018 |
| CN | 107781278 A | * | 3/2018 |
| CN | 107972691 A | | 5/2018 |
| CN | 108757815 A | | 11/2018 |
| CN | 209112183 U | | 7/2019 |
| CN | 209938591 U | | 1/2020 |
| JP | 2007253679 A | | 10/2007 |
| JP | 2012040982 A | | 3/2012 |
| KR | 20170108384 A | | 9/2017 |

* cited by examiner

ANTI-IMPACT DEVICE AND WORKING METHOD THEREOF

TECHNICAL FIELD

The present invention relates to a novel anti-impact device and a working method thereof, and in particular to an anti-impact buffering device used between two carriages of a mine car, and belongs to the technical field of buffering devices.

BACKGROUND ART

The mine car is the main means of transport in the production of the mine inclined shaft. With a certain slope at the outlet of the inclined shaft, the mine car often slides back to the shaft or causes mutual collision between carriages due to abnormal reasons. So far, in order to prevent accidents, it is required to take the protective measure of "one slope and three gears" at each shaft mouth in production operation, so as to prevent accidents to a certain extent.

When the mine car runs on the roadway, usually multiple carriages are connected end to end for operation. When the speed of the rear carriage is greater than that of the front carriage or the front carriage is braked, the buffer device needs to be mounted between two adjacent carriages for buffering in order to prevent the impact of the rear carriage, so as to achieve effective deceleration and prevent the overspeed of the mine car.

Chinese patent document CN 104057974A discloses a mine car having a self-lockable buffer belt. The mine car is composed of a frame, carriages, front mine car wheels, rear mine car wheels and a brake device, where the front mine car wheels and the rear mine car wheels are arranged at the lower part of the frame, the brake device is arranged on the rear mine car wheel, the carriages are arranged at the upper part of the frame, and buffer rubber is arranged at the bottoms of the carriages. The mine car is characterized in that the buffer rubber has the effect of buffering the crushing and damage from large hard materials to a car bottom, and the mine car can be braked by itself, can stand on the large-angle track independently, and has simple structure and high practicability.

For another example, Chinese patent document CN207550213U provides a mine car buffer. The mine car buffer includes a rectangular buffer body, a cylindrical buffer body and a flange plate which are sequentially connected together from top to bottom, where flange holes circumferentially and equidistantly distributed are provided on the flange plate, square head bolts with the same number as the flange holes are arranged in the flange holes in a penetrating manner, the upper ends of spiral springs sleeve the square head bolts, and the lower ends of the spiral springs are connected to a carriage body. According to the mine car buffer, the plurality of spiral springs are arranged on the carriage body to ensure sufficient buffer when the mine car stops; moreover, the cylindrical buffer body is arranged above the spiral spring to buffer the spiral spring and strengthen the buffering capacity; and finally, the rectangular buffer body composed of a plurality of layers of buffer pads is arranged above the cylindrical buffer body, which further improves the buffering performance, and the overall buffering performance is superior to that of the buffer in the prior art.

Upon search, so far, most of the buffers used on the mine car are the brake buffers for a single carriage, which are used for braking or anti-loss buffering, and no anti-collision buffer device used between carriages has been found. Thus, it is necessary to provide an anti-impact buffer device between carriages of the mine car, which can ensure stable operation between carriages and avoid collision damage between carriages.

SUMMARY

Aiming at the defects of the prior art, the present invention provides a novel anti-impact device. The novel anti-impact device is mounted between a front carriage and a rear carriage of a mine car, and when speeds of the front carriage and the rear carriage are inconsistent, the effects of preventing carriage collision and buffering carriage speed and impact force may be effectively achieved.

The present invention further provides a working method of the novel anti-impact device on a mine car.

The technical solution of the present invention is as follows:

the novel anti-impact device includes a first connector, an upper outer cylinder, a lower outer cylinder and a second connector which are sequentially connected, where the first connector is fixedly connected to the upper outer cylinder, the second connector is fixedly connected to the lower outer cylinder, and a top of the lower outer cylinder is sleeved with the upper outer cylinder to be movably connected to the upper outer cylinder;

an aluminum honeycomb and a magnetorheological buffer outer cylinder are arranged inside the lower outer cylinder, an upper end and a lower end of the magnetorheological buffer outer cylinder are packaged by means of an upper end cover and a lower end cover respectively, the aluminum honeycomb is arranged at a bottom of the lower end cover, a piston rod is arranged inside the magnetorheological buffer outer cylinder, a top end of the piston rod extends out of the upper end cover and is connected to a collision head, and the piston rod between the collision head and the upper end cover is sleeved with a return spring; and an electromagnetic coil is wound around the piston rod, a damping piston is arranged on a lower part of the piston rod, a damping hole is provided on the damping piston, a guide disc is arranged at a bottom end of the damping piston and makes contact with an inner wall of the magnetorheological buffer outer cylinder, and a lower part of the guide disc is filled with a magnetorheological fluid.

Preferably, the first connector and the second connector are both provided with connecting pin holes. The design has the advantage that the two connectors are connected between the two carriages by means of pins, which is convenient and rapid.

Preferably, the first connector is connected to an outer end cover of the upper outer cylinder by means of a bolt, and the second connector is connected to an outer end cover of the lower outer cylinder by means of a bolt.

Preferably, the lower outer cylinder is sleeved with a connecting ring, a flange extending outwards is arranged at a top of the lower outer cylinder, and blocks the connecting ring, and the connecting ring is connected to a bottom end of the upper outer cylinder by means of a bolt. The design has the advantage that the upper outer cylinder is fixedly connected to the connecting ring, and the connecting ring may drive the upper outer cylinder to slide back and forth on the lower outer cylinder, thereby achieving buffering.

Preferably, the upper end cover and the lower end cover are connected to the magnetorheological buffer outer cylinder by means of bolts.

Preferably, a baffle plate is arranged at a top end of the lower outer cylinder, and stops the magnetorheological buffer outer cylinder from sliding out of the lower outer cylinder.

Preferably, the baffle plate is connected to the top end of the lower outer cylinder by means of a bolt.

Preferably, the piston rod is a stepped rod and includes a protrusion, the electromagnetic coil is wound around the protrusion, the protrusion makes contact with an inner wall of the magnetorheological buffer outer cylinder, a cavity having an opening at a bottom end is provided on the damping piston, and the damping hole is in communication with the cavity.

Preferably, the guide disc is fixedly connected to a bottom end of the damping piston by means of a nut.

Preferably, the collision head is in threaded connection with the top end of the piston rod.

Preferably, the aluminum honeycomb is cylindrical. The design has the advantage that the aluminum honeycomb is a crushing device, an initial value of pressure borne by the device is a limit value of a magnetorheological buffer, and the device performs final buffering and energy absorption when the magnetorheological buffer fails.

The working method of a novel anti-impact device used between two carriages of a mine car connects the novel anti-impact device between the two carriages of the mine car, and the working method of the novel anti-impact device includes:

A Mine Car Upward Movement Stage when a speed of a front carriage is greater than that of a rear carriage, an upper outer cylinder pulling a lower outer cylinder to move upwards, a piston rod being in an extended state, a magnetorheological buffer outer cylinder being filled with a magnetorheological fluid, in such a condition, an electromagnetic coil being in an energized state, but a collision head being not impacted, and the novel anti-impact device not working; and when the speed of the front carriage is less than that of the rear carriage, a speed sensor on the mine car detecting a signal to generate an expected damping control force by means of a fuzzy controller while the speed of the car is changed, in such a condition, the upper outer cylinder sliding downwards, the collision head being impacted, an impact force being transmitted to a piston rod, so as to push a damping piston to move, the damping piston and fluid damping generated by the magnetorheological fluid jointly dissipating energy by means of a damping force of the magnetorheological fluid and a damping hole, and the novel anti-impact device acting in advance;

B Mine Car Downward Movement Stage when the speed of the front carriage is greater than that of the rear carriage, the lower outer cylinder pulling the upper outer cylinder to move downwards, the piston rod being in the extended state, the magnetorheological buffer outer cylinder being filled with the magnetorheological fluid, in such a condition, the electromagnetic coil being in the energized state, but the collision head being not impacted, and the novel anti-impact device not working; and when the speed of the front carriage is less than that of the rear carriage, the speed sensor on the mine car detecting a signal to generate an expected damping control force by means of the fuzzy controller while the speed of the car is changed, in such a condition, the upper outer cylinder sliding downwards, the collision head being impacted, an impact force being transmitted to the piston rod, so as to push the damping piston to move, the damping piston and fluid damping generated by the magnetorheological fluid jointly dissipating energy by means of a damping force of the magnetorheological fluid and the damping hole, and the novel anti-impact device acting in advance; and C Mine Car Accident Stage when the mine car is overspeed or even intercepted by a car barrier due to an accident, the speed sensor on the mine car detecting a signal, a generated speed variation e and an acceleration variation ec being used as input variables of the fuzzy controller, the novel anti-impact device outputting an expected damping force in advance, the collision head being impacted, the piston rod moving, the damping piston and fluid damping generated by the magnetorheological fluid jointly dissipating energy by means of a damping force of the magnetorheological fluid and the damping hole, and the novel anti-impact device performing buffering to prevent a subsequent car from causing secondary damage; and when an impact force causes a buffering limit of a magnetorheological buffer, an aluminum honeycomb crushing device performing final buffering protection.

The present invention has the beneficial effects:

1) The anti-impact device of the present invention is mounted between two carriages of a mine car, so as to prevent impact from a rear carriage to buffer same when a speed of the rear carriage is greater than that of a front carriage or the front carriage is braked, thereby achieving effective deceleration and preventing overspeed of the mine car, and so as to buffer a subsequent carriage when an accident happens, thereby effectively preventing secondary damage from the accident.

2) The anti-impact device of the present invention is connected and controlled by means of the two-dimensional fuzzy controller, when the accident happens to the mine car due to overspeed, corresponding intensity current may be output in advance by means of a sensor to control the corresponding damping force, and the anti-impact device enters a buffering state in advance, thereby effectively achieving buffering.

3) According to the anti-impact device of the present invention, by means of multi-stage buffering of the magnetorheological buffer and a crushing pipe, safety of the mine car is effectively ensured; an energy dissipation structure of the anti-impact device is buffered in a mixed manner by a magnetic circuit and the damping hole, current intensity of the magnetic circuit is dynamically controlled by a negative feedback control system to output a damping force, which uses semi-active control, and a damping force of the damping hole is controlled by relative speed of the piston rod and the outer cylinder, which belongs to passive control.

4) The anti-impact device of the present invention is connected and controlled by the two-dimensional fuzzy controller, and the two-dimensional fuzzy controller outputs currents with different intensities to control the magnitude of the damping force, thereby improving self-adaptability of the anti-impact device.

In the figures, 1—connecting pin hole (a pin connected between two carriages); 2—outer end cover; 3—collision head; 4—return spring; 5—piston rod; 6—connecting ring; 7—electromagnetic coil; 8—damping piston (internally having a damping hole); 9—magnetorheological buffer outer cylinder; 10—aluminum honeycomb; 11—lower end cover; 12—lower outer cylinder; 13—guide disc; 14—upper end cover; 15—upper outer cylinder; and 16—baffle plate.

DETAILED DESCRIPTION OF THE EMBODIMENTS

The present invention is further described below with reference to the embodiments and in conjunction with the accompanying drawings, but is not limited to this.

Embodiment 1

As shown in FIGS. 1-4, the embodiment provides a novel anti-impact device. The novel anti-impact device includes a first connector, an upper outer cylinder 15, a lower outer cylinder 12 and a second connector which are sequentially connected, where the first connector is fixedly connected to the upper outer cylinder 15, the second connector is fixedly connected to the lower outer cylinder 12, and a top of the lower outer cylinder 12 is sleeved with the upper outer cylinder 15 to be movably connected to the upper outer cylinder 15;

an aluminum honeycomb 10 and a magnetorheological buffer outer cylinder 9 are arranged inside the lower outer cylinder 12, an upper end and a lower end of the magnetorheological buffer outer cylinder 9 are packaged by means of an upper end cover 14 and a lower end cover 11 respectively, the aluminum honeycomb 10 is arranged at a bottom of the lower end cover 11, a piston rod 5 is arranged inside the magnetorheological buffer outer cylinder 9, a top end of the piston rod 5 extends out of the upper end cover 14 and is connected to a collision head 3, and the piston rod between the collision head 3 and the upper end cover 14 is sleeved with a return spring 4; and an electromagnetic coil 7 is wound around the piston rod 5, a damping piston 8 is arranged on a lower part of the piston rod, a damping hole is provided on the damping piston, a guide disc 13 is arranged at a bottom end of the damping piston 8, the guide disc 13 makes contact with an inner wall of the magnetorheological buffer outer cylinder, and a lower part of the guide disc 13 is filled with a magnetorheological fluid.

Specifically, the first connector and the second connector are of the same structure and are both provided with connecting pin holes. During use, the two connectors are connected between two carriages by means of plugs, such that mounting is rapid and convenient. The first connector is connected to an outer end cover 2 of the upper outer cylinder 15 by means of a bolt, and the second connector is connected to an outer end cover of the lower outer cylinder 12 by means of a bolt. The outer end cover 2 of the upper outer cylinder and the upper outer cylinder 15 are of an integrated structure, and the outer end cover of the lower outer cylinder and the lower outer cylinder 12 are of an integrated structure, both of which are bosses extending outwards, which are fixedly connected to bosses of the first connector and the second connector through bolts.

The lower outer cylinder 12 is sleeved with a connecting ring 6, a flange extending outwards is arranged at a top of the lower outer cylinder 12, and blocks the connecting ring 6, that is, an inner diameter of the connecting ring 6 is less than an outer diameter of the flange, and the connecting ring 6 is connected to a bottom end of the upper outer cylinder 15 by means of a bolt. The upper outer cylinder 15 is fixedly connected to the connecting ring 6, thereby ensuring that the upper outer cylinder 15 is not disengaged from the lower outer cylinder 12 in a buffering process, and the connecting ring 6 may drive the upper outer cylinder 15 to slide back and forth on the lower outer cylinder 12, thereby achieving buffering.

The upper end cover 14 and the lower end cover 11 are connected to the magnetorheological buffer outer cylinder 9 by means of bolts. A baffle plate 16 is mounted at a top end of the lower outer cylinder 12 by means of a bolt, and the baffle plate 16 stops the magnetorheological buffer outer cylinder 9 from sliding out of the lower outer cylinder 12.

The piston rod 5 is a stepped rod and includes a protrusion, the electromagnetic coil 7 is wound around the protrusion, and the protrusion makes contact with an inner wall of the magnetorheological buffer outer cylinder 9; the damping piston 8 is part of the piston rod 5, the damping piston and the piston rod 5 are integrally manufactured and formed, a cavity having an opening at a bottom end is provided on the damping piston 8, and the damping hole is in communication with the cavity. By means of the cavity and the damping hole, the magnetorheological fluid below the guide disc may achieve circulation buffering. An elongated hole channel is provided inside the piston rod 5, and a wire connected to the electromagnetic coil 7 is arranged by means of the elongated hole channel.

The bottom end of the damping piston 8 is provided with threads, and the bottom end of the damping piston 8 penetrates a center of the guide disc 13 to be fixedly provided with the guide disc 13 by means of a nut.

The collision head 3 is in threaded connection with the top end of the piston rod 5. When the upper outer cylinder 15 and the lower outer cylinder 12 slide relatively, the collision head 3 is impacted by the upper outer cylinder 15, and the piston rod 5 is displaced to achieve buffering. The return spring 4 is used for returning the novel anti-impact device after buffering is completed.

Figure 1:
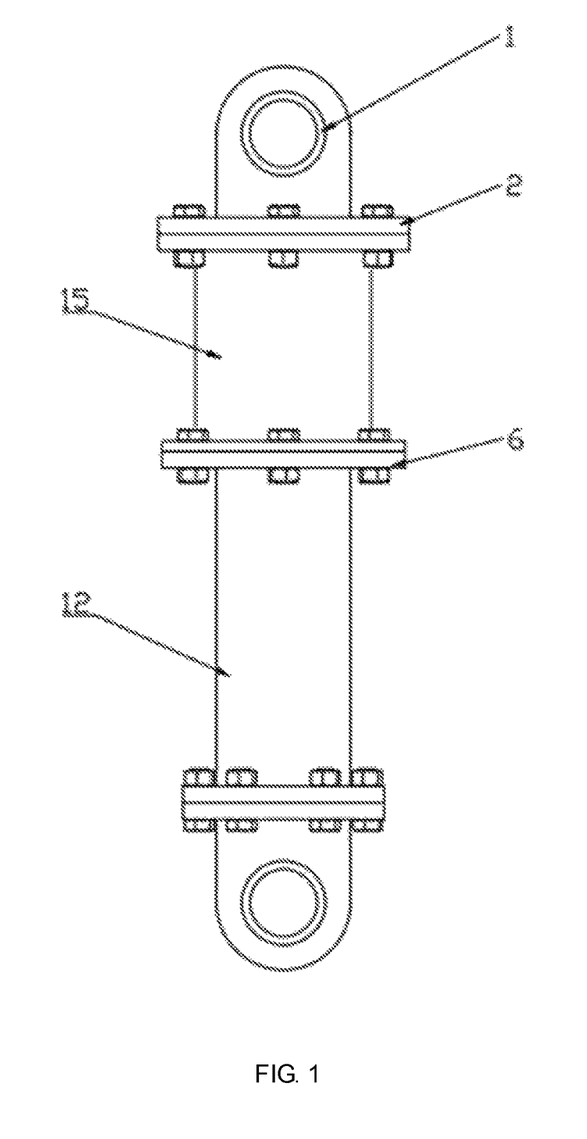
FIG. 1 is a front view of an anti-impact device of the present invention.
Figure 2:
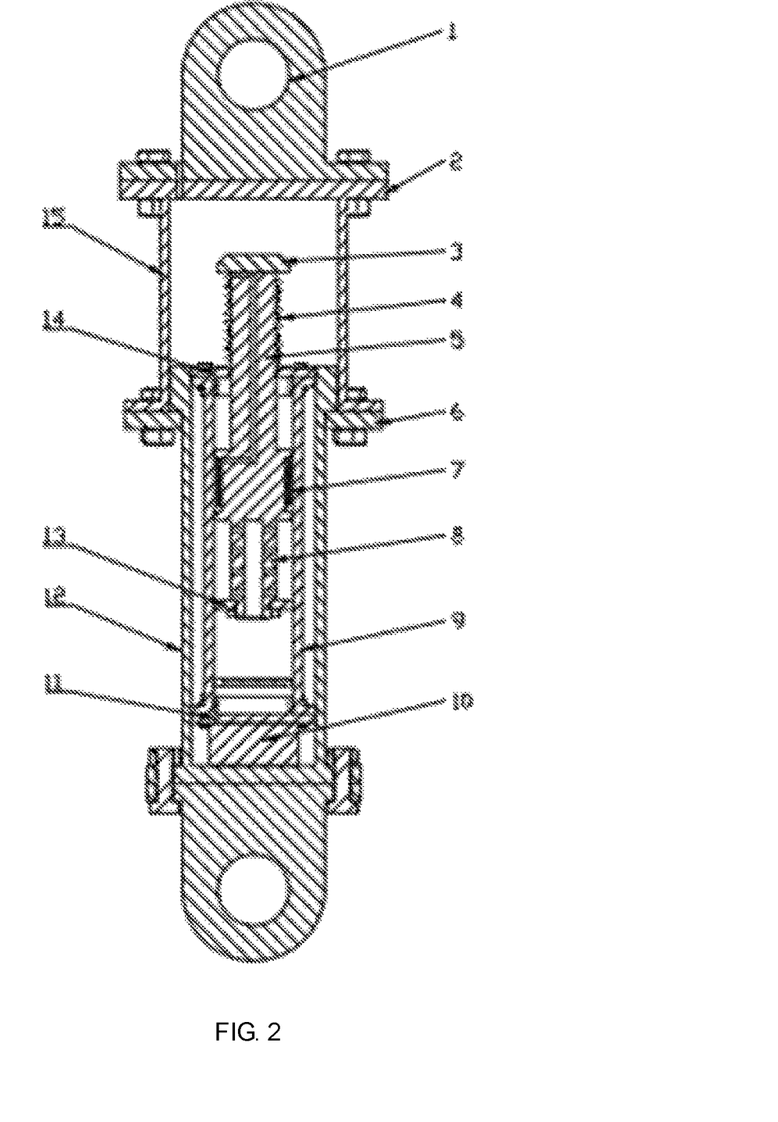
FIG. 2 is a sectional view of the anti-impact device of the present invention.
Figure 3:
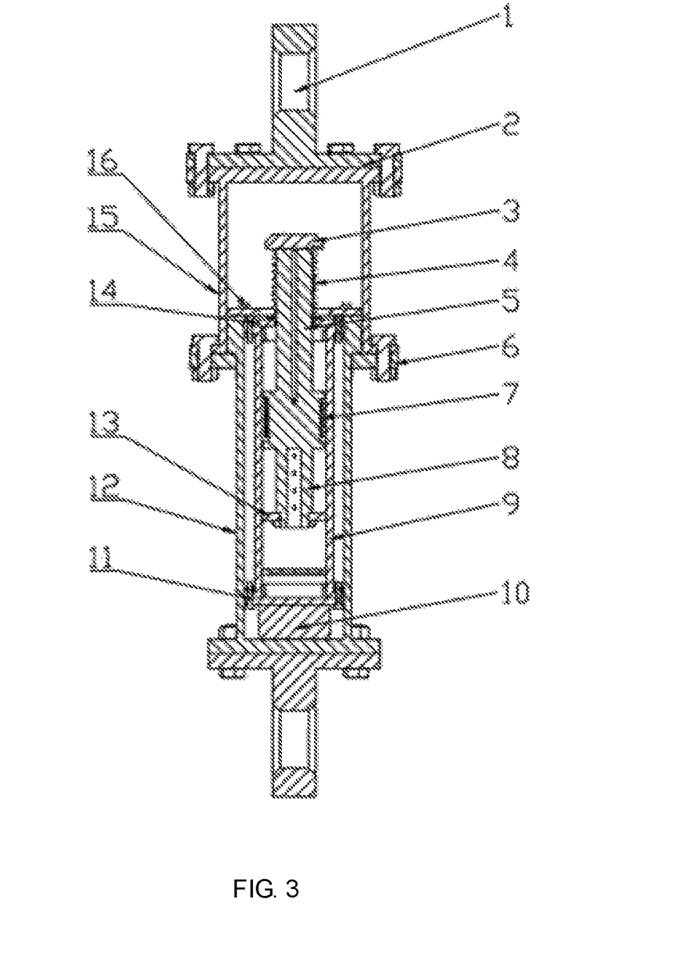
FIG. 3 is a left-side sectional view of the anti-impact device of the present invention.
Figure 4:
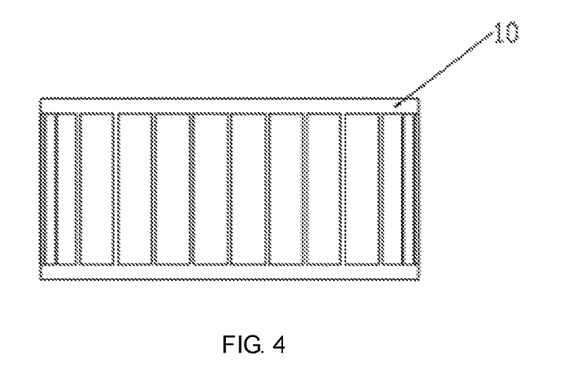
FIG. 4 is a schematic diagram of an aluminum honeycomb crushing structure in the present invention.

The aluminum honeycomb 10 is cylindrical and placed at a bottom of the magnetorheological buffer outer cylinder 9, the aluminum honeycomb 10 is a crushing device, an initial value of pressure borne by the device is a limit value of a magnetorheological buffer, and when the magnetorheological buffer fails, the device performs final buffering and energy absorption.

In the embodiment, the novel anti-impact devices are connected and mounted on two sides and a middle of the carriage by means of a plug, and three novel anti-impact devices are mounted on every two carriages. A buffer device structure of the novel anti-impact device may be mounted at a front end of a car head after the baffle plate is mounted at the collision head 3, such that a car body may be effectively protected when an accident happens, and buffering is provided for subsequent cars, thereby reducing car body damage.

Embodiment 2

A working method of a novel anti-impact device used between two carriages of a mine car connects the novel anti-impact device of embodiment 1 between the two carriages of the mine car, that is, a first connector and a second connector are connected to two adjacent carriages by means of pins, then the anti-impact device and a speed sensor on the mine car are both connected to a two-dimensional fuzzy controller to form a buffer control system, and the working method of a novel anti-impact device includes:

A Mine Car Upward Movement Stage when a speed of a front carriage is greater than that of a rear carriage, an upper outer cylinder 15 pulls a lower outer cylinder 12 to move upwards, a piston rod 5 is in an extended state, a magnetorheological buffer outer cylinder 9 is filled with a magnetorheological fluid, in such a condition, an electromagnetic coil 7 is in an energized state, but a collision head 3 is not impacted, and the novel anti-impact device does not work; and when the speed of the front carriage is less than that of the rear carriage, the speed sensor on the mine car detects a signal to generate an expected damping control force by means of the fuzzy controller while the speed of the car is changed, in such a condition, the upper outer cylinder 15 slides downwards, the collision head 3 is impacted, an impact force is transmitted to the piston rod 5, so as to push the damping piston 8 to move, the damping piston 8 and fluid damping generated by the magnetorheological fluid jointly dissipate energy by means of a damping force of the magnetorheological fluid and the damping hole, and the novel anti-impact device acts in advance; and B Mine Car Downward Movement Stage when the speed of the front carriage is greater than that of the rear carriage, the lower outer cylinder 12 pulls the upper outer cylinder 15 to move downwards, the piston rod 5 is in the extended state, the magnetorheological buffer outer cylinder 9 is filled with the magnetorheological fluid, in such a condition, the electromagnetic coil 7 is in the energized state, but the collision head 3 is not impacted, and the novel anti-impact device does not work; and when the speed of the front carriage is less than that of the rear carriage, the speed sensor on the mine car detects a signal to generate an expected damping control force by means of the fuzzy controller while the speed of the car is changed, in such a condition, the upper outer cylinder 15 slides downwards, the collision head 3 is impacted, an impact force is transmitted to the piston rod 5, so as to push the damping piston 8 to move, the damping piston 8 and fluid damping generated by the magnetorheological fluid jointly dissipate energy by means of a damping force of the magnetorheological fluid and the damping hole, and the novel anti-impact device acts in advance; and C Mine Car Accident Stage when the mine car is overspeed or even intercepted by a car barrier due to an accident, the speed sensor on the mine car detects a signal, a generated speed variation e and an acceleration variation ec are used as input variables of the fuzzy controller, the novel anti-impact device outputs an expected damping force in advance, the collision head 3 is impacted, the piston rod 5 moves, the damping piston 8 and fluid damping generated by the magnetorheological fluid jointly dissipate energy by means of a damping force of the magnetorheological fluid and the damping hole, and the novel anti-impact device performs buffering to prevent a subsequent car from causing secondary damage; and when an impact force causes a buffering limit of a magnetorheological buffer, an aluminum honeycomb 10 crushing device performs final buffering protection.

Figure 5:
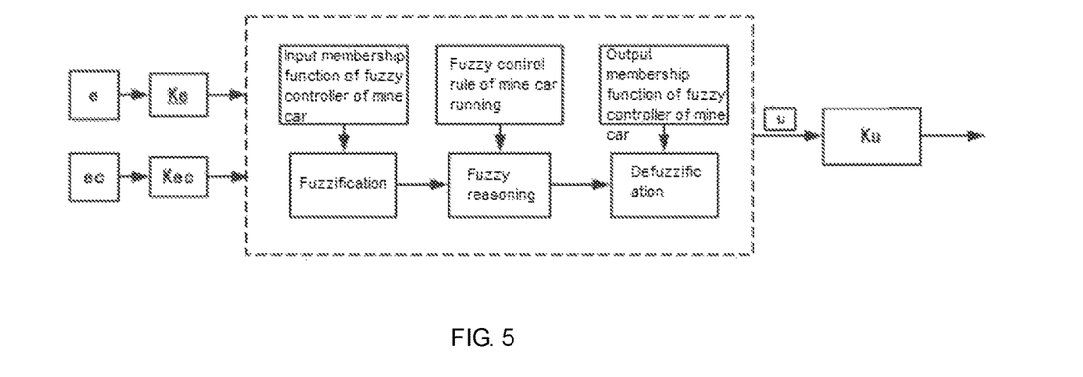
FIG. 5 is a schematic diagram of a fuzzy controller in the present invention.

A principle of the fuzzy controller provided in the embodiment is shown in FIG. 5. When a car runs, the sensor detects the signal to generate the speed variation e (difference between an expected car speed and an actual car speed) and the acceleration variation ec (difference between an expected car acceleration and an actual car acceleration) as input variables of the fuzzy controller, according to selected quantization factors ke and kec, the input variables are scaled according to a certain proportion, is mapped to a fuzzy discourse domain from a physical discourse domain, is input into a membership function for fuzzification by means of the fuzzy controller, and is subjected to fuzzy reasoning according to a formulated fuzzy rule, a fuzzy reasoning method uses a common Mamdani type, and performs defuzzification by outputting the membership function, an area bisection method is selected for defuzzification to obtain an accurate output, and then the output is scaled by a certain proportionality coefficient ku to obtain the expected damping force.

Figure 6:
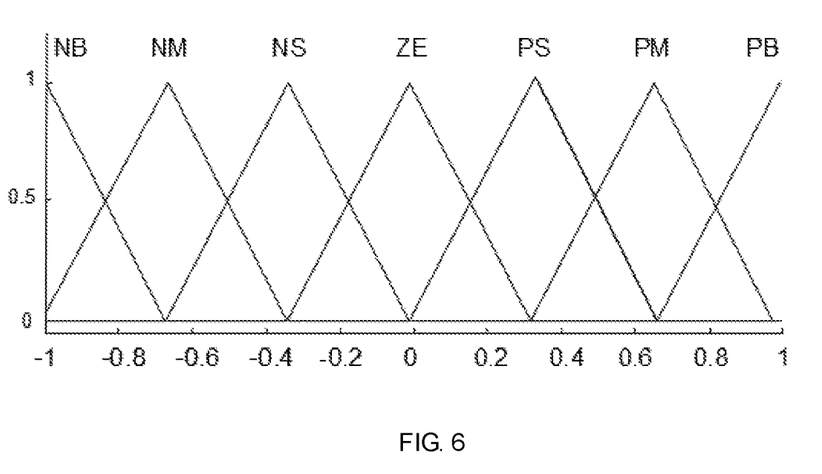
FIG. 6 is a distribution curve of an input and output membership function.

A process of fuzzification is as follows:

differences between a reference expected value and a car body speed and a car body acceleration are selected from the fuzzy controller to serve as two input variables, and the expected damping control force is selected to serve as an output variable. The input variables v and a are set to be seven language subsets: NB (negative big), negative medium (NM), negative small (NS), zero (ZE), positive small (PS), positive medium (PM) and positive big (PB), the discourse domain is limited between [−1, 1], the input membership functions are all triangular functions, and are shown in FIG. 6. In order to facilitate calculation, the output variable uses a membership function consistent with the input variable. Actual variation ranges of the input and output variables are determined by the corresponding quantization factors ke and kec and a scaling factor ku respectively.

A method of fuzzy reasoning is as follows:

fuzzy reasoning is to carry out reasoning operation by means of the fuzzy rule, and according to working characteristics of the novel anti-impact device when the mine car runs, there are the following principles when the fuzzy rule corresponding to the characteristics is designed:

(1) when |e| is in a big state, an error between a car speed and the expected car speed is big, and large current should be output to generate a large damping force.

When |e| is in a medium-size state, the error of the car speed is medium, and medium-size current should be output to generate a medium-size damping force.

When |e| is in a small state, the error of the car speed is small, and small current should be output or no current should be output to generate a small damping force.

According to car process analysis, it may be seen that when the error is big, the fuzzy controller should select a big output control variable to eliminate the error as soon as possible. When the error is small, the small output control variable should be selected to avoid overshoot. Thus, according to an "If-and-Then" adjustment principle, the corresponding fuzzy control rules are shown in Table 1.

where the rule "If e is NS and ec is PB, Then u is PM" may be interpreted as follows: when the error e is small, the car body speed is not much different from the expected value, meanwhile, a positive big error value change rate ec indicates that the car body speed is rapidly approaching a reference value, but the car body acceleration is still big, and thus the controller should output a positive median value to prevent overshoot and restrain the increase of the car body acceleration, and other control rules are similar to the above rule.

TABLE 1

Fuzzy control rule

| ec | e | | | | | | |
|----|----|----|----|----|----|----|----|
|    | NB | NM | NS | ZE | PS | PM | PB |
| NB | NB | NM | NM | NM | NM | NS | ZE |
| NM | NB | NM | NM | NM | NS | ZE | PS |
| NS | NM | NM | NM | NS | ZE | PS | PM |
| ZE | NM | NM | NS | ZE | PS | PM | PM |
| PS | NM | NS | ZE | PS | PM | PM | PM |
| PM | NS | ZE | PS | PM | PM | PM | PB |
| PB | ZE | PS | PM | PB | PM | PM | PB |

Defuzzification Process:

the dfuzzification process is a mapping process of finding a clear value to replace an output fuzzy value, and after fuzzy reasoning, a graph enclosed by part of the output membership function and a coordinate axis is generally obtained. According to the obtained graph, an area center method is used for defuzzification.

The invention claimed is:

1. A anti-impact device, comprising a first connector, an upper outer cylinder, a lower outer cylinder and a second connector which are sequentially connected, wherein the first connector is fixedly connected to the upper outer cylinder, the second connector is fixedly connected to the lower outer cylinder, and a top of the lower outer cylinder is sleeved with the upper outer cylinder to be movably connected to the upper outer cylinder;

an aluminum honeycomb and a magnetorheological buffer outer cylinder are arranged inside the lower outer cylinder, an upper end and a lower end of the magnetorheological buffer outer cylinder are packaged by means of an upper end cover and a lower end cover respectively, the aluminum honeycomb is arranged at a bottom of the lower end cover, a piston rod is arranged inside the magnetorheological buffer outer cylinder, a top end of the piston rod extends out of the upper end cover and is connected to a collision head, and the piston rod between the collision head and the upper end cover is sleeved with a return spring; and an electromagnetic coil is wound around the piston rod, a damping piston is arranged on a lower part of the piston rod, a damping hole is provided on the damping piston, a guide disc is arranged at a bottom end of the damping piston and makes contact with an inner wall of the magnetorheological buffer outer cylinder, and a lower part of the guide disc is filled with a magnetorheological fluid.

2. The anti-impact device of claim 1, wherein the first connector and the second connector are both provided with connecting pin holes.

3. The anti-impact device of claim 1, wherein the first connector is connected to an outer end cover of the upper outer cylinder by means of a bolt, and the second connector is connected to an outer end cover of the lower outer cylinder by means of a bolt.

4. The anti-impact device of claim 1, wherein the lower outer cylinder is sleeved with a connecting ring, a flange extending outwards is arranged at a top of the lower outer cylinder, and blocks the connecting ring, and the connecting ring is connected to a bottom end of the upper outer cylinder by means of a bolt.

5. The anti-impact device of claim 1, wherein the upper end cover and the lower end cover are connected to the magnetorheological buffer outer cylinder by means of bolts.

6. The anti-impact device of claim 1, wherein a baffle plate is arranged at a top end of the lower outer cylinder, and stops the magnetorheological buffer outer cylinder from sliding out of the lower outer cylinder.

7. The anti-impact device of claim 6, wherein the baffle plate is connected to the top end of the lower outer cylinder by means of a bolt.

8. The anti-impact device of claim 1, wherein the guide disc is fixedly connected to a bottom end of the damping piston by means of a nut.

9. A working method of the anti-impact device of claim 1 used between two carriages of a mine car, the anti-impact device being connected between two carriages of the mine car, and the working method of the anti-impact device comprising:

A mine car upward movement stage when a speed of a front carriage is greater than that of a rear carriage, an upper outer cylinder pulling a lower outer cylinder to move upwards, a piston rod being in an extended state, a magnetorheological buffer outer cylinder being filled with a magnetorheological fluid, in such a condition, an electromagnetic coil being in an energized state, but a collision head being not impacted, and the anti-impact device not working; and when the speed of the front carriage is less than that of the rear carriage, a speed sensor on the mine car detecting a signal to generate an expected damping control force by means of a fuzzy controller while the speed o of the car is changed, in such a condition, the upper outer cylinder sliding downwards, the collision head being impacted, an impact force being transmitted to a piston rod, so as to push a damping piston to move, the damping piston and fluid damping generated by the magnetorheological fluid jointly dissipating energy by means of a damping force of the magnetorheological fluid and a damping hole, and the anti-impact device acting in advance;

B mine car downward movement stage when the speed of the front carriage is greater than that of the rear carriage, the lower outer cylinder pulling the upper outer cylinder to move downwards, the piston rod being in the extended state, the magnetorheological buffer outer cylinder being filled with the magnetorheological fluid, in such a condition, the electromagnetic coil being in the energized state, but the collision head being not impacted, and the anti-impact device not working; and when the speed of the front carriage is less than that of the rear carriage, the speed sensor on the mine car detecting a signal to generate an expected damping control force by means of the fuzzy controller while the speed of the car is changed, in such a condition, the upper outer cylinder sliding downwards, the collision head being impacted, an impact force being transmitted to the piston rod, so as to push the damping piston to move, the damping piston and fluid damping generated by the magnetorheological fluid jointly dissipating energy by means of a damping force of the magnetorheological fluid and the damping hole, and the anti-impact device acting in advance; and C mine car accident stage when the mine car is overspeed or even intercepted by a car barrier due to an accident, the speed sensor on the mine car detecting a signal, a generated speed variation e and acceleration variation ec being used as input variables of the fuzzy controller, the anti-impact device outputting an expected damping force in advance, the collision head being impacted, the piston rod moving, the damping piston and fluid damping generated by the magnetorheological fluid jointly dissipating energy by means of a damping force of the magnetorheological fluid and the damping hole, and the anti-impact device performing buffering to prevent a subsequent car from causing secondary damage; and when an impact force causes a buffering limit of a magnetorheological buffer, an aluminum honeycomb crushing device performing final buffering protection.

* * * * *